3,013,041
DECARBORANE DERIVATIVES CONTAINING TWO HYDROCARBYL RADICALS AND A GROUP V-A ELEMENT AND THEIR PREPARATION

Victor D. Aftandilian, Wilmington, Del., assignor to E. I. du Pont de Nemours and Company, Wilmington, Del., a corporation of Delaware
No Drawing. Filed Oct. 29, 1959, Ser. No. 849,459
12 Claims. (Cl. 260—440)

This invention relates to novel derivatives of decaborane and to their preparation. More particularly, this invention relates to such derivatives containing certain elements of group V-A of the periodic table and to a process for their preparation.

Boron compounds have received considerable study during recent years and during this time the boron hydrides, including decaborane, have been found useful in various applications. Particular applications for these boron hydrides and their derivatives that have been developed include high energy fuels and chemical reducing agents. It is therefore a desirable goal to provide new decaborane derivatives having particular characteristics that make them especially useful in these and other applications.

It is an object of this invention to provide novel derivatives of decaborane and a process for their preparation. A further object is to provide a new class of decaborane derivatives containing certain elements of group V-A of the periodic table. Other objects will appear hereinafter.

These and other objects of this invention are accomplished by providing novel products having the general formula $R_2MB_{10}H_{13}$, wherein the R's are monovalent hydrocarbyl and the two R's can be the same or different, and M is an element of group V-A of the periodic table having an atomic number not greater than 51, i.e., nitrogen, phosphorus, arsenic or antimony. A preferred group of the products of this invention is that in which the R's in the above general formula are alkyl or aryl radicals of not more than 10 carbon atoms. The periodic table referred to in this application is the table given in Deming's "General Chemistry," 5th ed. (1944), John Wiley and Sons, Inc.

The products of this invention are prepared by reaction of an ethereal solution of the Grignard derivative of decaborane ($B_{10}H_{13}MgX'$, where X' is halogen of atomic number of at least 17, i.e., chlorine, bromine or iodine) with a compound of the formula $R_2MX$, wherein the R groups are monovalent hydrocarbyl radicals, i.e., monovalent hydrocarbon radicals, which can be the same or different, M is an element of group V-A of the periodic table having atomic number no greater than 51, and X is a halogen. The preferred halogen in the $R_2MX$ compound has an atomic number of at least 17, i.e., is chlorine, bromine or iodine.

The reaction between the $B_{10}H_{13}MgX'$ and the $R_2MX$ is carried out with equimolar quantities of reactants in an ether reaction medium. Any ether that can be used in preparing a Grignard reagent is suitable as a reaction medium in the process of this invention. Examples of suitable ethers include tetrahydrofuran and dialkyl ethers, such as diethyl ether, di-n-propyl ether, and di-n-butyl ether.

The reaction can be carried out at a temperature ranging from about 0° to 150° C. or more but not above the decomposition temperature of any product or reactant. It is conveniently carried out at the reflux temperature of the particular ether being used as reaction medium, e.g., using diethyl ether as reaction medium, a reaction temperature of about 35° C. is convenient.

The reaction is continued for a period of time ranging from about 1 to 20 hours, depending on the particular reactants being used. Generally reaction times of 2–4 hours are sufficient.

The products of this invention are isolated from the reaction mixture by removal of the ether, for example, by distillation, followed by extraction of the residue with a hydrocarbon solvent, e.g., petroleum ether, in which the product is sparingly soluble. The product is then crystallized from the petroleum ether solution. In some cases the products of this invention can be isolated by treatment of the reaction mixture with an approximately stoichiometrically equivalent amount of a saturated, aqueous ammonium chloride solution to decompose the Grignard complex, after which the mixture is extracted with diethyl ether and the ether then removed by distillation or evaporation.

Dioxanates of the products of this invention can also be prepared, if desired, by addition of dioxane to the reaction product obtained after decomposition of the Grignard complex by aqueous ammonium chloride.

The products of this invention are soluble in benzene and ethers, are only slightly soluble in aliphatic hydrocarbons, e.g., petroleum ether, and are insoluble in water. The products of this invention are chemical reducing agents and they are capable of reducing ions of silver and iron to the free metals.

The decaborane Grignard derivatives used as one of the starting materials in the process of this invention can be prepared by the method described in J. Am. Chem. Soc. 80, 4523 (1958). This method involves reaction of methylmagnesium iodide in ether solution with decaborane. The ether solution of the Grignard decaborane derivative can be used directly after removal of the by-product methane, and need not be isolated from the ether solution. The $R_2MX$ starting materials can be made by known methods. Thus, diphenylchloroarsine can be prepared by heating triphenylarsine with arsenic trichloride in an autoclave at 250–280° C. for three hours, by the method described by Morgan and Vining, J. Chem. Soc., 117, 780 (1920). Diphenylchlorostibine can be prepared similarly from triphenylstibine and antimony trichloride. Diphenylchlorophosphine can be prepared by heating phenyldichlorophosphine at 300° C. for 96–120 hours, as described by Dörken, Ber., 21, 1505 (1888).

This invention is illustrated in further detail by the following examples in which the proportions of the ingredients are expressed in parts by weight unless otherwise specified.

EXAMPLE I

*Diphenylphosphinodecaborane*

A 100-ml. flask equipped with a condenser and a side arm for introduction of liquids is attached to a vacuum train and 3.62 g. of decaborane (0.0296 mole) is placed in it. The flask is cooled with liquid nitrogen, evacuated to a pressure of 0.001 mm. of mercury and 100 ml. of diethyl ether, dried over calcium hydride, is condensed into it. The flask is maintained at −196° C. while 12 ml. of a diethyl ether solution of methylmagnesium iodide (approximately 2.0 molar) is introduced into it. The reaction vessel is then gradually brought to room temperature with strong stirring. During this time methane is evolved and it is passed through two cold traps kept at −125° C. There is obtained 0.0245 mole of methane. After the evolution of methane has subsided, a clear yellow-green solution is left in the reaction vessel.

The reaction vessel containing the decaborane magnesium iodide solution is filled with nitrogen and 4.92 g. of diphenylchlorophosphine (0.0223 mole) is introduced into it. The flask is heated 3 hours at 35° C.

and at the end of this time a clear, green-yellow solution is obtained. The diethyl ether is removed by vacuum distillation and 100 ml. of dry petroleum ether is condensed into the reaction vessel. The mixture is heated to boiling and filtered while hot to remove the insoluble magnesium halides. On cooling the filtrate, there is obtained 0.68 g. (10% of theory) of a white solid melting at 136–137° C. This is diphenylphosphinodecaborane.

*Analysis.*—Calc'd for $(C_6H_5)_2PB_{10}H_{13}$: B, 35.30%; P, 10.11%; C, 47.02%; H, 7.56%; M.W., 306. Found: B, 35.81%; P, 9.74%; C, 46.25%; H, 7.68%; M.W., 341.

Infrared analysis shows bands at 3.25, 6.3 and 14.45 microns which are assigned to =CH, aromatic—C=C— and monosubstituted aromatic groups, respectively. There is a band at 3.95 microns representing the B–H function.

The diphenylphosphinodecaborane is soluble in benzene, alcohol and ethers. It is insoluble in water and very slightly soluble in aliphatic hydrocarbons. Its solutions reduce silver nitrate to metallic silver.

EXAMPLE II

Diphenylarsinodecaborane

A solution of 0.0156 mole of decaborane magnesium iodide is prepared from 2.96 g. (0.0242 mole) of decaborane and 9 ml. of an approximately 2.0 molar diethyl ether solution of methylmagnesium iodide by the procedure described in the first paragraph of Example I. The reaction vessel containing this solution is swept out with nitrogen and a 5 ml. suspension of 4.10 g. of diphenylchloroarsine (0.0155 mole) in diethyl ether is added to it. The mixture is stirred and heated to 35° C. for 18 hours. At the end of this time a clear yellow solution is obtained. The diethyl ether is then distilled out of the reaction vessel and about 200 ml. of dry petroleum ether is condensed into it. The mixture is heated to boiling and filtered hot to remove insoluble magnesium halides. On cooling the filtrate, there is obtained 0.23 g. of white, solid diphenylarsinodecaborane. This compound decomposes at 180° C.

*Analysis.*—Calc'd for $(C_6H_5)_2AsB_{10}H_{13}$: As, 21.38%; C, 41.13%. Found: As, 22.76, 21.58%; C, 40.39%.

The infrared absorption spectrum of this compound is very similar to that of diphenylphosphinodecaborane. The product is soluble in benzene, alcohol and ethers but is insoluble in water and only slightly soluble in aliphatic hydrocarbons. Alcoholic solutions of the diphenylarsinodecaborane reduce the ferric ion in ferric chloride to metallic iron and the silver ion in silver nitrate to silver metal. However, the alcoholic solutions do not reduce nickel ion to the free metal. The diphenylarsinodecaborane is hypergolic with nitric acid. The addition of concentrated nitric acid to the arsinic compound causes it to ignite spontaneously.

EXAMPLE III

Dimethylaminodecaborane

Following the procedure described in the first paragraph of Example I, 0.061 mole of the Grignard derivative of decaborane is prepared from methylmagnesium bromide and decaborane. The reaction vessel containing the ether solution of the decaborane Grignard derivative is swept out with nitrogen and 128 ml. of a solution of 0.04 mole of dimethylchloroamine in diethyl ether is added to it. The mixture is heated to the boiling point of diethyl ether and is stirred for 4 hours. At the end of this time a creamy yellow solid is obtained. The addition of 30 ml. of a cold, saturated, aqueous solution of ammonium chloride to the reaction mixture causes the decomposition of the Grignard complex. The resulting reaction product is extracted several times with diethyl ether and the ethereal extracts are dried over anhydrous calcium sulfate. A yellow oil is obtained on concentration of this solution. This oil is dimethylaminodecaborane. The addition of 100 ml. of dioxane to this oil results in the formation of a yellow solid amounting to 0.62 g. and melting at 123–124° C. This is a dioxanate of dimethylaminodecaborane.

*Analysis.*—Calc'd for $(CH_3)_2NB_{10}H_{13} \cdot 2C_4H_8O_2$: B, 31.68%; N, 4.10%; C, 35.16%; H, 10.33%. Found: B, 32.62%; N, 4.44%; C, 31.19%; H, 10.65%.

In addition to the decaborane magnesium iodide and decaborane magnesium bromide illustrated in the Examples, decaborane magnesium chloride can also be used in the process of this invention. Likewise, in addition to the specific $R_2MX$ reactants illustrated in the examples, any compound of the general formula $R_2MX$ in which the R's are monovalent hydrocarbon radicals and the X is halogen, preferably chlorine, bromine or iodine, can be used in the process of this invention. In this process such compounds in which the R groups are alkyl or aryl radicals of 1–10 carbon atoms are preferred. Thus, when the specific $R_2MX$ compounds listed in the first column of the following Table I are reacted with a decaborane magnesium halide, the products listed in the second column of this table are obtained.

TABLE I

| $R_2MX$ | Product |
|---|---|
| $(C_2H_5)_2PCl$ Diethylchlorophosphine | $(C_2H_5)_2PB_{10}H_{13}$ Diethylphosphinodecaborane |
| $(n-C_4H_9)_2AsI$ Di-n-butyliodoarsine | $(n-C_4H_9)_2AsB_{10}H_{13}$ Di-n-butylarsinodecaborane |
| $(C_6H_{13})_2SbCl$ Dihexylchlorostibbine | $(C_6H_{13})_2SbB_{10}H_{13}$ Dihexylstibinodecaborane |
| $(p-CH_3C_6H_4)_2PI$ Di-p-tolyliodophosphine | $(p-CH_3C_6H_4)_2PB_{10}H_{13}$ Di-p-tolylphosphinodecaborane |
| $(n-C_{10}H_{21})_2PBr$ Di-n-decylbromophosphine | $(n-C_{10}H_{21})_2PB_{10}H_{13}$ Di-n-decylphosphinodecaborane |
| $(C_{10}H_7)_2PCl$ Dinaphthylchlorophosphine | $(C_{10}H_7)_2PB_{10}H_{13}$ Dinaphthylphosphinodecaborane |
| $(CH_3)(C_2H_5)PBr$ Methylethylbromophosphine | $(CH_3)(C_2H_5)PB_{10}H_{13}$ Methylethylphosphinodecaborane |
| $(CH_3)(C_6H_5)AsBr$ Methylphenylbromoarsine | $(CH_3)(C_6H_5)AsB_{10}H_{13}$ Methylphenylarsinodecaborane |
| $(C_6H_5)_2NCl$ Diphenylchloroamine | $(C_6H_5)_2NB_{10}H_{13}$ Diphenylaminodecaborane |

The decaborane derivatives of this invention are useful in various applications. They are particularly useful as chemical reducing agents. As indicated in the examples, alcoholic solutions of these products are effective reducing agents in reducing silver and ferric ions to metallic silver and iron.

The products of this invention also ignite spontaneously when contacted with concentrated nitric acid. This is a valuable property which makes them useful as high energy fuels.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound having the general formula $$R_2MB_{10}H_{13}$$

wherein each R is selected from the group consisting of alkyl radicals and aryl radicals and M is an element of group V-A of the periodic table having an atomic number not greater than 51.

2. A compound having the general formula $$R_2MB_{10}H_{13}$$

wherein each R is an alkyl radical of not more than 10 carbon atoms and M is an element of group V-A of the periodic table having an atomic number not greater than 51.

3. A compound having the general formula $$R_2MB_{10}H_{13}$$

wherein each R is an aryl radical of not more than 10 carbon atoms and M is an element of group V-A of the periodic table having an atomic number not greater than 51.

4. Diphenylphosphinodecaborane.

5. Diphenylarsinodecaborane.

6. Dimethylaminodecaborane.

7. Process of preparing a decaborane derivative which comprises contacting and reacting, in an ether reaction medium, a compound having the formula $B_{10}H_{13}MgX'$ wherein X' is halogen having an atomic number of at least 17 with a compound having the formula $R_2MX$ wherein each R is selected from the group consisting of alkyl radicals and aryl radicals, M is an element of group V-A of the periodic table having an atomic number not greater than 51, and X is halogen.

8. Process of preparing a decaborane derivative which comprises contacting and reacting, at a temperature within the range of 0–150° C. in an ether reaction medium, a compound having the formula $B_{10}H_{13}MgX'$ wherein X' is halogen having an atomic number of at least 17 with a compound having the formula $R_2MX$ wherein each R is an alkyl radical of not more than 10 carbon atoms, M is an element of group V-A of the periodic table having an atomic number not greater than 51, and X is halogen having an atomic number of at least 17.

9. Process of preparing a decaborane derivative which comprises contacting and reacting, at a temperature within the range of 0–150° C. in an ether reaction medium, a compound having the formula $B_{10}H_{13}MgX'$ wherein X' is halogen having an atomic number of at least 17, with a compound having the formula $R_2MX$ wherein each R is an aryl radical of not more than 10 carbon atoms, M is an element of group V-A of the periodic table having an atomic number not greater than 51, and X is halogen having an atomic number of at least 17.

10. Process of preparing diphenylphosphinodecaborane which comprises contacting and reacting, at a temperature within the range of 0–150° C. in an ether reaction medium, decaborane magnesium iodide with diphenylchlorophosphine.

11. Process of preparing diphenylarsinodecaborane which comprises contacting and reacting, at a temperature within the range of 0–150° C. in an ether reaction medium, decaborane magnesium iodide with diphenylchloroarsine.

12. Process of preparing dimethylaminodecaborane which comprises contacting and reacting, at a temperature within the range of 0–150° C. in an ether reaction medium, decaborane magnesium bromide with dimethylchloroamine.

No references cited.